Feb. 18, 1936.　　　M. M. FISHER　　　2,030,861
TIRE RETREADING MOLD
Filed June 26, 1934　　　3 Sheets-Sheet 1
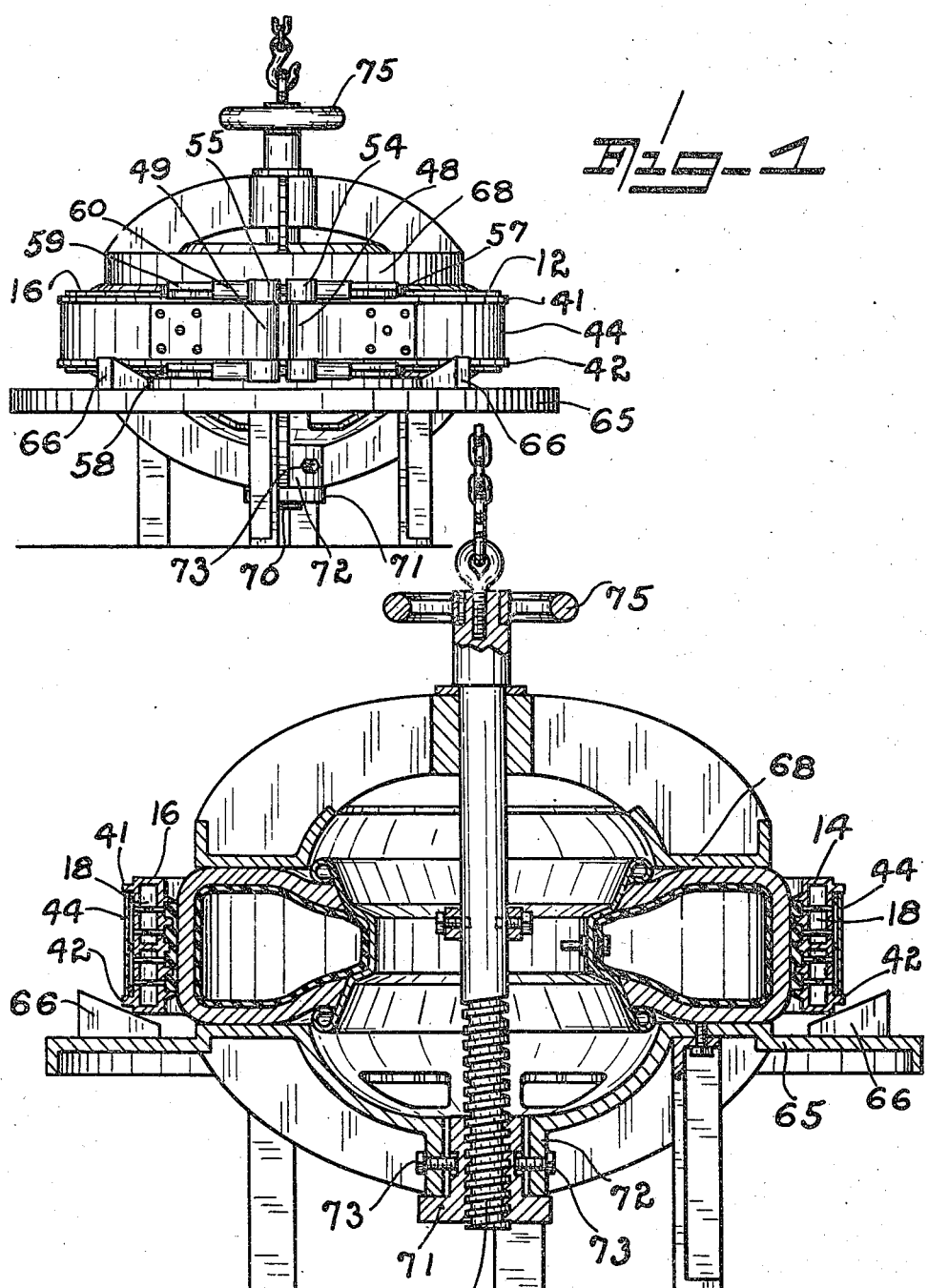
INVENTOR
Martin M. Fisher
BY
Smith & Tuck
ATTORNEYS Feb. 18, 1936.  M. M. FISHER  2,030,861
TIRE RETREADING MOLD
Filed June 26, 1934   3 Sheets-Sheet 2
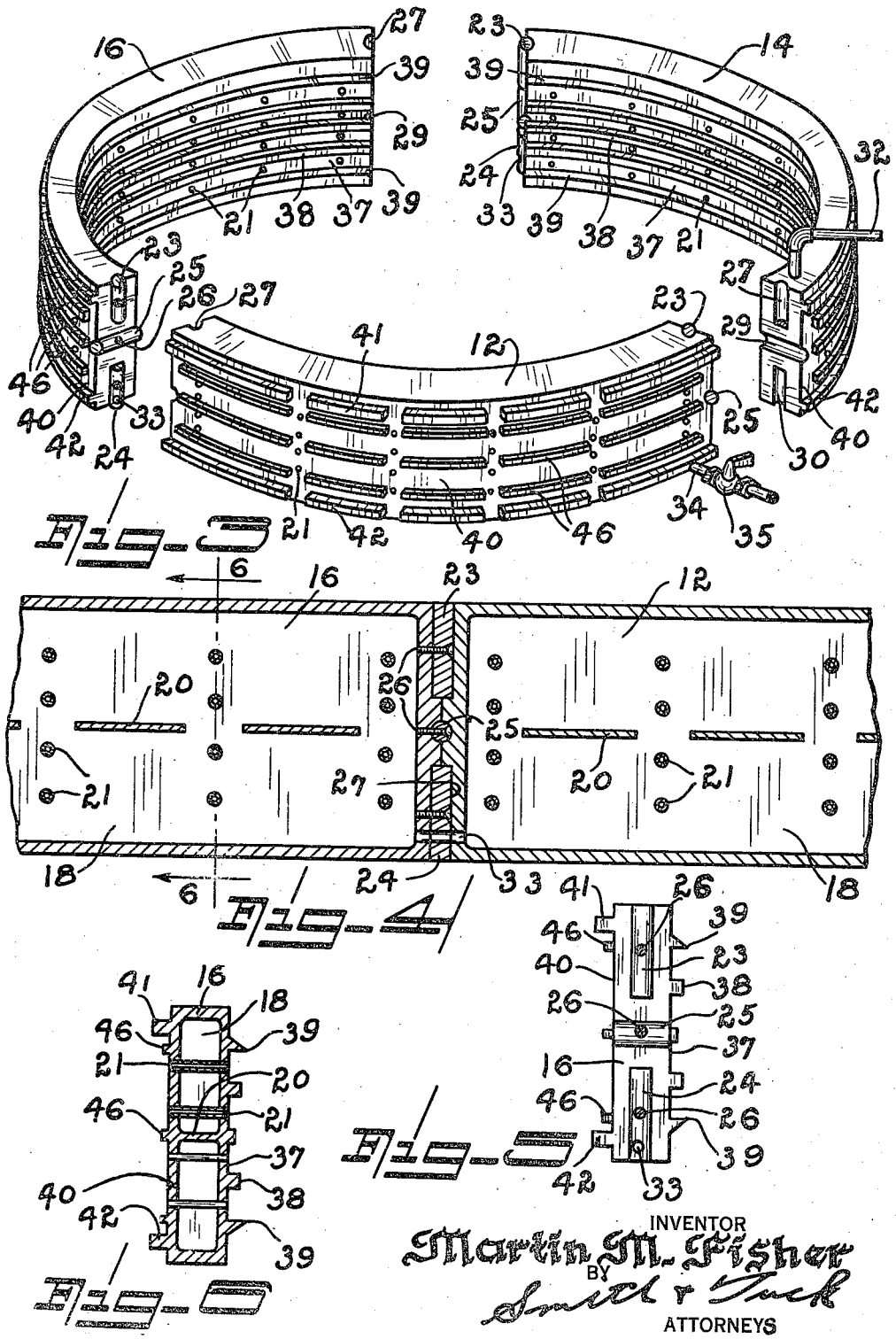

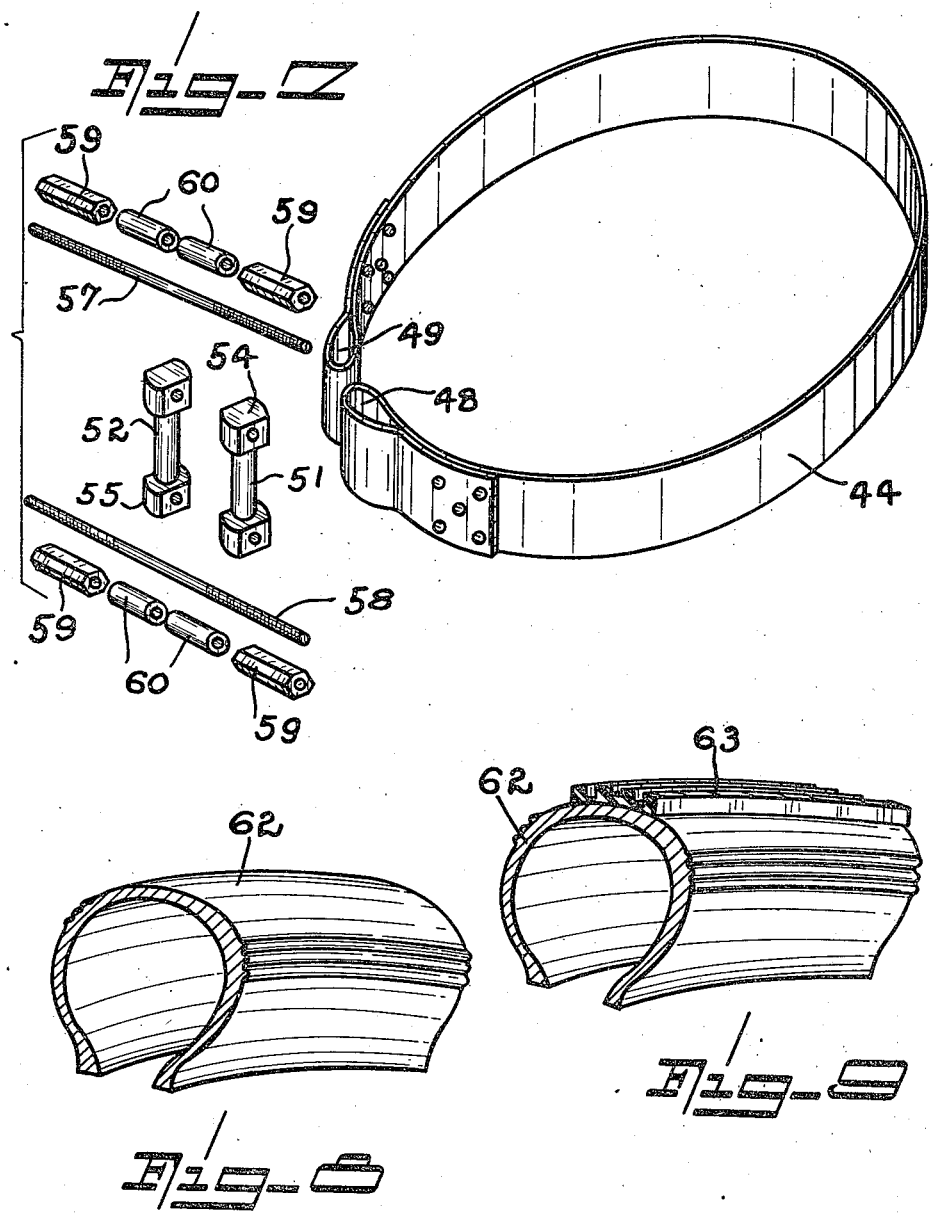

Patented Feb. 18, 1936

2,030,861

UNITED STATES PATENT OFFICE 2,030,861

TIRE RETREADING MOLD

Martin M. Fisher, Seattle, Wash.

Application June 26, 1934, Serial No. 732,545

5 Claims. (Cl. 18—18)

My invention relates to a method and means for retreading tires and, more particularly, to a tire retreading mold.

The relatively high initial cost of the larger tires, used particularly on the larger cars, busses and trucks, has created a need for a tire retreading mold, which can quickly and properly retread the wearing surface of tires so that the full life of the expensive tire carcasses can be used.

My present equipment is so constructed that it permits of a new method of retreading tires, wherein the tire carcass is held substantially in an undistorted condition and wherein the only portion of the tire that is cured is that immediately adjacent the new rubber applied. This adds greatly to the life of the tire carcasses as the side walls and the margins of the original tread surfaces are maintained practically without rise in temperature. This has effected a great economy as it adds so greatly to the wearing quality of the retreaded tire as against those retreads where the carcass itself is heated. With my method of retreading there is no danger of loosening up the bonding rubber that holds the layers of cord and fabric in place.

Another feature of my equipment is that it permits the retreading of a tire without the necessity of using bulky and unwieldy equipment that is often used to distort the tire carcass during the retreading operation.

Other and more specific objects will be apparent from the following description taken in connection with the accompanying drawings, wherein Figure 1 is an elevation of a tire mold made after the teachings of my invention.

Figure 2 is a vertical, sectional view through my tire mold showing a tire inflated ready for curing.

Figure 3 illustrates, in perspective, the plurality of segments making up my continuous mold.

Figure 4 is a vertical, sectional view thru one of the joints of my mold.

Figure 5 is a face view of one of the joints showing the centering means employed.

Figure 6 is a cross-sectional view, as on the line 6—6 of Figure 4, showing particularly the method of venting my mold so that unwanted air can escape.

Figure 7 is a perspective view showing the compression band used to hold my mold in position and also showing in exploded relationship, the compression rods and fixtures used to tighten the band.

Figure 8 illustrates, in fragmentary form, the cross-section of a tire ready for application of the retread material.

Figure 9 illustrates the same section with the retread material cemented in place thereon.

Figure 10 illustrates a portion of the retread material before it is applied to the tire.

Referring to the drawings, throughout which like reference characters indicate like parts, 12, 14 and 16 designate a plurality of similar segments which go to make up my continuous mold. In the present illustrations I have shown three such segments. This seems to be a desirable number, altho the number might be increased if they were to be used on very large tires where the weight might make them unwieldy to handle. Each of the segments is provided with an open steam chamber 18. This chamber, because of the relatively thin side walls, is strengthened by a plurality of lugs 20 which extend from one wall to the other and thus support the same against distortion when steam pressure is applied to chamber 18. As shown in Figure 6, particularly, I provide a plurality of tubes connecting the working face of the mold with the outside so that unwanted air can be driven out thru the passage way.

To provide a definite engagement between the segments and to hold them in exact alignment, I provide vertically disposed centering lugs 23 and 24 and, also, horizontally disposed lugs 25. These centering lugs are secured to the segments as by screws 26 which pass thru the same and are tapped into the casting of the segments. The centering means are adapted to engage complemental recesses 27, 29 and 30 in the adjacent mold segment. The exact shape of these lugs is a matter of choice, altho I have found that, if they are round, tight joints can be quite easily obtained.

A steam supply pipe, as 32, is tapped into one of the segments so as to obtain free communication with the chamber 18. At each of the two joints, where sections 12 and 14 abut segment 16, I provide communicating openings as 33 so that the steam will be free to circulate thru the three sections and out the discharge pipe 34. This discharge pipe should preferably be provided with a valve as 35 so that the steam within the mold can be maintained at any desired pressure. The discharge pipe 34 should preferably be near the bottom of the mold so that condensation will be carried out by the escaping steam.

The working face of the mold, which engages the tire, as 37 is provided with a plurality of outwardly extending lugs or ledges 38. These may be so disposed that they will form, in the entire mold, angular ledges or they may form any desired pattern, so that when the retreading is completed the desired roughening of the tread will be accomplished. It is very desirable that the pattern forming lugs, or rings, which engage the center of the tread be of less extent than those that engage the edges. This is to provide added thickness of cured rubber under the centrally disposed grooves or indentations, so that splitting of the new tread will be prevented. Lugs 39 are disposed at the outer edge of the retread material and serve as shears so that any material flowing out past them may be easily torn off the mold.

The outer face 40 of the mold is provided with angular rings that extend outwardly considerably, as 41 and 42, which are adapted to engage and center the compression band 44, I find it desirable to provide a plurality of outstanding ribs as 46 to hold the compression band somewhat away from face 40 so that the vent pipes 21 will not be obstructed, further it is desirable to interrupt or cut away portions of ribs 41, 42 and 46 so that a free flow of air can be at all times assured.

Band 44 should be made, preferably, of steel that is fairly flexible and is folded back on itself at each end to form loops as 48 and 49. These loops are intended to accommodate the pivotable pins 51 and 52. These pins, in turn, are provided with enlarged heads, one on each end, as 54 and 55, which are adapted to accommodate the threaded rods 57 and 58. A plurality of spacers as 60 are provided to fit over rods 57 and 58, so that nuts 59 can be tightened on the tension rods 57 and 58 and squeeze the band together thus closing the three segments of the mold about the tire.

In Figure 8 I have illustrated a section of the tire 62 prepared ready for treatment. The tread surface is finished smoothly so as to provide a firm base for the rubber tread 63, this is cemented to the tire as shown in Figure 9. In retreading a tire the new material 63 is usually placed upon the tire before the same is applied to its rim, or wheel. When it is desired to cure the rubber, the tire is then placed upon its rim, or wheel, and the three segments, comprising the mold, disposed around it. Band 44 is placed over the segments and, by means of tightening up rods 57 and 58, the mold is tightly seated on the tire, compressing it somewhat, particularly, the new rubber 63. As soon as the three segments meet in tight engagement so as to complete the true circle, the tire with the mold attached is placed on the press table 65, after the showing of Figure 2. A plurality of wedges as 66 are inserted under the mold proper so as to hold it in position and to prevent its weight causing it to shift downwardly. The upper clamp member 68 is then lowered over the tire and tension screw 70 is engaged in its nut 71. This nut is relatively loose in hub 72, which is formed as part of table 65 and is secured in place by a plurality of set screws 73 which are not so tight as to hold it rigid but rather to allow it to align itself with screw 70. Hand wheel 75 is then tightened and the tire is compressed between table 65 and clamp member 68, so as to more securely hold the mold in position.

Just before the steam is turned into the mold it is found desirable to inflate the tube so that the tread portion of the tire will not crowd away from the mold when it becomes heated and semiplastic. The internal air pressure keeps the tread portion of the tire carcass fully pressed against the mold and facilitates forming the roughened tread surface. It is desired to particularly point out, at this time, that the major portion of the pressure required during the curing operation is provided by band 44 as it forces together the segments forming the mold. This pressure is increased by the press arrangement which tends to slightly flatten the side walls of the tire. Now it should be remembered that the tires to which this equipment is particularly adapted are large, heavy carcasses, that will in themselves resist, to a large degree, any distortion. The tire, even before air is applied, is under considerable compression, this compression is maintained, during the curing operation, by virtue of the fact that excepting for that portion of the tire immediately adjacent the newly applied rubber, the balance of the tire is cold and the natural resiliency of the carcass provides, in a great measure, the pressure required for satisfactory vulcanizing of the tread material to the tire.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

Having thus fully described my invention, what I claim as new and desire to secure by Letters Patent is:—

1. In a tire retreader the combination with a tire support and an annular clamp ring adapted to engage the upper wall of said tire, and means for compressing said ring, of a plurality of arcuate segments having steam heating passageways therethrough, horizontal tubes through said segments, and a series of spaced, exterior rings thereon, co-acting means on adjoining ends of said segments making air tight connections between said steam passageways, and an exterior, annular, clamp ring surrounding said segments and co-acting with said spaced rings for outlet of excess air, and clamping means therefor.

2. In a tire retreader, the combination with a tire support having a central bearing-nut, an annular clamp ring engaging the upper wall of a tire, and a screw bar journaled in the clamp ring and threaded in said nut for compressing the ring on the tire, of a plurality of arcuate segments having steam heating passages therethrough, centering lugs and recesses on adjoining ends of said segments forming air tight connections therebetween, an exterior annular clamp ring surrounding the segments, and means for clamping the last mentioned ring on said segments.

3. In a tire retreader, the combination with a tire support, a clamp ring to engage the upper wall of a tire, and means for compressing the ring on the tire, of a plurality of arcuate segments having steam-heating passages therethrough, transversely arranged vent tubes in said segments terminating at opposite ends thereof, co-acting means on adjoining ends of said segments for making steam tight connections between said passages, each said segment having a pair of spaced exterior centering lugs and spacing lugs intermediate the centering lugs, a clamp ring located between the spaced centering lugs and in contact with the spacing lugs, and clamping means for the clamp ring.

4. A tire retreader comprising a plurality of arcuate segments having steam-heating passages therethrough, co-acting vertical lugs and recesses and co-acting horizontal lugs and recesses on adjoining ends of and forming joints between said segments, one set of lugs and recesses at each joint making air-tight connection between adjoining passages, and means for clamping said segments in operative position.

5. A tire retreader comprising a plurality of arcuate segments having steam heating passages therethrough and steam connections between adjoining ends of said segments, means for introducing steam to one of said segments, said segments having exterior steam outlet ports, a plurality of rows of spaced lugs on the exterior of said segments forming annular series around the retreader, an annular clamp for the retreader, and said segments also having on their interior faces a plurality of annular groove-forming ribs a central one of which is of less depth than the remainder of the ribs.

MARTIN M. FISHER.